United States Patent
Gotoh et al.

(10) Patent No.: US 9,523,992 B2
(45) Date of Patent: Dec. 20, 2016

(54) POWER CONTROL DEVICE AND POWER CONTROL METHOD

(75) Inventors: Shigefumi Gotoh, Tokyo (JP); Keisuke Akiho, Tokyo (JP); Hirohisa Yoshikawa, Tokyo (JP)

(73) Assignee: RKC INSTRUMENT INC., Tokyo (JP)

(*) Notice: Subject to any disclaimer, the term of this patent is extended or adjusted under 35 U.S.C. 154(b) by 182 days.

(21) Appl. No.: 14/421,517

(22) PCT Filed: Sep. 13, 2012

(86) PCT No.: PCT/JP2012/073440
§ 371 (c)(1),
(2), (4) Date: Feb. 13, 2015

(87) PCT Pub. No.: WO2014/041653
PCT Pub. Date: Mar. 20, 2014

(65) Prior Publication Data
US 2015/0212533 A1    Jul. 30, 2015

(51) Int. Cl.
*G05F 1/66* (2006.01)
*H02J 3/14* (2006.01)

(52) U.S. Cl.
CPC .. *G05F 1/66* (2013.01); *H02J 3/14* (2013.01); *Y02B 70/3225* (2013.01); *Y04S 20/222* (2013.01); *Y10T 307/422* (2015.04)

(58) Field of Classification Search
CPC ...................................... G05F 1/66; H02J 3/14
See application file for complete search history.

(56) References Cited

U.S. PATENT DOCUMENTS 4,061,485 A * 12/1977 Rimmel .................. D04H 3/03
156/62.4
4,080,088 A * 3/1978 Koester ................. E01C 11/126
29/415

(Continued)

FOREIGN PATENT DOCUMENTS

EP    2560260 A1    2/2013
JP    3022051       3/2000

(Continued)

OTHER PUBLICATIONS

Supplementary European Search Report and Written Opinion dated Apr. 7, 2016 for Application No. 12884428.9, 7 pgs.

(Continued)

*Primary Examiner* — Rexford Barnie
*Assistant Examiner* — Terrence Willoughby
(74) *Attorney, Agent, or Firm* — Frost Brown Todd LLC

(57) ABSTRACT

To prevent loss of controllability associated with the change in total target power value, and suppress power supply voltage fluctuation.

An upper limit value calculation section 20 is provided, which adds a correction value $H_n$ calculated by a correction value calculation section 19 to a sum total $\Sigma x_n$ of target power values $x_{1n}$ to $x_{Mn}$ calculated by a total target power value calculation section 18, so as to calculate a power upper limit value $P_{LIM}$ for every load, such that an appropriate power upper limit value $P_{LIM}$ may be obtained depending on variation of the sum total $\Sigma x_n$ of target power values $x_{1n}$ to $x_{Mn}$.

9 Claims, 15 Drawing Sheets

(56) References Cited

U.S. PATENT DOCUMENTS

| | | | | | |
|---|---|---|---|---|---|
| 4,283,635 | A | * | 8/1981 | Balmer | H02J 3/14 307/141 |
| 4,324,987 | A | * | 4/1982 | Sullivan, II | H02J 3/14 307/35 |
| 4,920,252 | A | * | 4/1990 | Yoshino | G05D 23/1934 219/485 |
| 5,615,105 | A | * | 3/1997 | Tofigh | H02J 13/0062 307/31 |
| 8,915,250 | B2 | | 12/2014 | Dugan et al. | |
| 8,996,140 | B2 | | 3/2015 | Goto et al. | |
| 2013/0285448 | A1 | | 10/2013 | Yoshinaga | |

FOREIGN PATENT DOCUMENTS

| | | |
|---|---|---|
| JP | 3674951 | 7/2005 |
| JP | 3754974 | 3/2006 |
| JP | 4529153 | 8/2010 |
| JP | 2010-220363 | 9/2010 |
| JP | 201-205731 | 10/2011 |
| WO | WO 2011/118103 A1 | 9/2011 |
| WO | WO 2012/086572 A1 | 6/2012 |

OTHER PUBLICATIONS

English Machine Translation of Japanese Patent Publication No. JP 3022051.

English Machine Translation of Japanese Patent Publication No. JP 3674951.

English Machine Translation of Japanese Patent Publication No. JP 3754974.

English Machine Translation of Japanese Patent Publication No. JP 4529153.

English Machine Translation of Japanese Patent Publication No. JP 2010-220363.

English Machine Translation of Japanese Patent Publication No. JP 2011-205371.

Chinese Office Action dated Nov. 17, 2015 for Application No. CN 201280075649.9, 3 pgs.

International Search Report and Written Opinion dated Dec. 18, 2012 for Application No. PCT/JP2012/073440, 12 pgs.

* cited by examiner

| control cycle | target power value | intermediate integrated power value | threshold | actual power value | power difference integrated value |
|---|---|---|---|---|---|
| 1 | 30 | 30 | 0 | 100 | -70 |
| 2 | 30 | -40 | 0 | 0 | -40 |
| 3 | 30 | -10 | 0 | 0 | -10 |
| 4 | 30 | 20 | 0 | 100 | -80 |
| 5 | 30 | -50 | 0 | 0 | -50 |
| 6 | 30 | -20 | 0 | 0 | -20 |
| 7 | 30 | 10 | 0 | 100 | -90 |
| 8 | 30 | -60 | 0 | 0 | -60 |
| 9 | 30 | -30 | 0 | 0 | -30 |
| 10 | 30 | 0 | 0 | 0 | 0 |
| 11 | 30 | 30 | 0 | 100 | -70 |
| 12 | 30 | -40 | 0 | 0 | -40 |
| 13 | 30 | -10 | 0 | 0 | -10 |
| 14 | 30 | 20 | 0 | 100 | -80 |
| 15 | 30 | -50 | 0 | 0 | -50 |
| 16 | 30 | -20 | 0 | 0 | -20 |
| 17 | 30 | 10 | 0 | 100 | -90 |
| 18 | 30 | -60 | 0 | 0 | -60 |
| 19 | 30 | -30 | 0 | 0 | -30 |
| 20 | 30 | 0 | 0 | 0 | 0 |
| average | 30 | | | 30 | |

FIG. 5B

| control cycle | target power value | intermediate integrated power value | threshold | actual power value | power difference integrated value |
|---|---|---|---|---|---|
| 1 | 55 | 55 | 0 | 100 | -45 |
| 2 | 55 | 10 | 0 | 100 | -90 |
| 3 | 55 | -35 | 0 | 0 | -35 |
| 4 | 55 | 20 | 0 | 100 | -80 |
| 5 | 55 | -25 | 0 | 0 | -25 |
| 6 | 55 | 30 | 0 | 100 | -70 |
| 7 | 55 | -15 | 0 | 0 | -15 |
| 8 | 55 | 40 | 0 | 100 | -60 |
| 9 | 55 | -5 | 0 | 0 | -5 |
| 10 | 55 | 50 | 0 | 100 | -50 |
| 11 | 55 | 5 | 0 | 100 | -95 |
| 12 | 55 | -40 | 0 | 0 | -40 |
| 13 | 55 | 15 | 0 | 100 | -85 |
| 14 | 55 | -30 | 0 | 0 | -30 |
| 15 | 55 | 25 | 0 | 100 | -75 |
| 16 | 55 | -20 | 0 | 0 | -20 |
| 17 | 55 | 35 | 0 | 100 | -65 |
| 18 | 55 | -10 | 0 | 0 | -10 |
| 19 | 55 | 45 | 0 | 100 | -55 |
| 20 | 55 | 0 | 0 | 0 | 0 |
| average | 55 | | | 55 | |

FIG. 5C

| control cycle | target power value | intermediate integrated power value | threshold | actual power value | power difference integrated value |
|---|---|---|---|---|---|
| 1 | 5 | 5 | 0 | 100 | -95 |
| 2 | 10 | -85 | 0 | 0 | -85 |
| 3 | 15 | -70 | 0 | 0 | -70 |
| 4 | 20 | -50 | 0 | 0 | -50 |
| 5 | 25 | -25 | 0 | 0 | -25 |
| 6 | 30 | 5 | 0 | 100 | -95 |
| 7 | 35 | -60 | 0 | 0 | -60 |
| 8 | 40 | -20 | 0 | 0 | -20 |
| 9 | 45 | 25 | 0 | 100 | -75 |
| 10 | 50 | -25 | 0 | 0 | -25 |
| 11 | 45 | 20 | 0 | 100 | -80 |
| 12 | 40 | -40 | 0 | 0 | -40 |
| 13 | 35 | -5 | 0 | 0 | -5 |
| 14 | 30 | 25 | 0 | 100 | -75 |
| 15 | 25 | -50 | 0 | 0 | -50 |
| 16 | 20 | -30 | 0 | 0 | -30 |
| 17 | 15 | -15 | 0 | 0 | -15 |
| 18 | 10 | -5 | 0 | 0 | -5 |
| 19 | 5 | 0 | 0 | 0 | 0 |
| 20 | 0 | 0 | 0 | 0 | 0 |
| average | 25 | | | 25 | |

POWER CONTROL DEVICE AND POWER CONTROL METHOD

TECHNICAL FIELD

The present invention relates to a power control device and a power control method for time-divisionally controlling power supplied to a plurality of loads.

BACKGROUND OF THE INVENTION

For example, Patent Documents 1 and 2 below describe a power control device that supplies, to a load such as a heater, power proportional to a manipulated signal (target value) output from a PID controller.

This power control device switches on and off the power supplied to the load at time intervals corresponding to an integral multiple a half cycle of a power source waveform (hereinafter referred to as "unit time"), and supplies to the load the power proportional to the manipulated signal (target value) output from the PID controller by controlling a time rate of ON time during which the power is supplied to OFF time during which the power is not supplied.

Below, a mode for controlling the power with this power control device is referred to as "time-divisional output control mode".

In control of the power supplied to N loads (channels), when each channel is controlled in the time-divisional output control mode, the number of channels powered at one time (the number of channels turned on at one time) in each unit time ranges between 0 (all channels are OFF) and N (all channels are ON).

FIG. 6 is a diagram showing one example of ON/OFF states of channels when power control is conducted for 16 channels in the time-divisional output control mode.

As evidenced by FIG. 6, all of the 16 channels may be OFF, or all of the 16 channels may be ON. Therefore, the number of channels turned on at one time ranges between 0 and 16.

Further, Patent Documents 3-5 below disclose a power control method for suppressing a total output power value (sum of consumed power values in one or more channels being powered) to or below a preset power upper limit value (upper limit value of supplied power values with respect to all of the channels per unit time) in each unit time by limiting the number of channels powered at one time in each unit time (hereinafter referred to as "peak power suppression control").

PRIOR ART DOCUMENT

Patent Document

Patent Document 1: Japanese Patent No. 3022051
Patent Document 2: Japanese Patent No. 3674951
Patent Document 3: Japanese Patent No. 3754974
Patent Document 4: Japanese patent No. 4529153
Patent Document 5: Japanese Patent Application Publication 2

SUMMARY OF THE INVENTION

Problems to be Solved by the Invention

Since the power control device for conventional peak power suppression control is configured as stated above, the total output power value for a plurality of channels is suppressed to or below the preset power upper limit value in each unit time. However, the power upper limit value is a preset fixed value (e.g., a value set by a user in view of power supply capacity in a factory, an amount of power required for control, etc.), and its setting is not automatically changed.

Therefore, for example, if the power upper limit value is set to be close to a total value of an amount of power required for stabilized temperature control, there is a problem that even if a total target power value (sum of target power values of respective channels) is large as shown in FIG. 8 at Area B (which may be caused by an effect such as elevated temperature, setting change, or disturbance), the total output power value is suppressed to or below the power upper limit value, but it takes a long time to reach a target temperature, thereby compromising controllability. Further, due to a delayed disturbance response, there is a problem with failure of optimal temperature control.

On the other hand, if the total target power value is smaller than necessary relative to the power upper limit value as shown in FIG. 8 at Area A, there is a problem that a difference between the maximum and minimum values of the total output power values in respective unit time is large, thereby increasing power supply voltage fluctuation.

The present invention was made to solve the above problems, and is intended to obtain a power control device and a power control method which may prevent loss in controllability associated with a change in total target power value and suppress the power supply voltage fluctuation.

Means for Solving the Problem

The power control device according to the present invention comprises:

a plurality of switching control means for switching on and off power supplied to each controlled object at time intervals of predetermined unit time;

a target power value calculation means for calculating a target power value that is a target value of the power supplied to each controlled object;

an output power value calculation means for calculating an output power value that is a value of the power supplied to each controlled object;

a power estimation means for estimating, for each controlled object, from the output power value calculated by the output power value calculation means while the power is supplied, a power value when the power is supplied to the controlled object within the unit time in the next control cycle;

an intermediate integrated power value calculation means for calculating a power difference integrated value by repeating an addition of the target power value calculated by the target power value calculation means and a subtraction of the output power value calculated by the output power value calculation means in every control cycle, and adding the power difference integrated value up to the previous control cycle and the target power value in the next control cycle calculated by the target power value calculation means, so as to calculate, for each controlled object, the added value that is the latest intermediate integrated power value; and an upper limit value calculation means for calculating an upper limit value of supplied power values for all of the controlled objects per unit time, based on a sum total of the target power values of the respective controlled objects calculated by the target power value calculation means;

wherein a power control means repeats, with respect to the respective controlled objects in order beginning with a controlled object having a larger intermediate integrated power value calculated by the intermediate integrated power value calculation means, the control to turn on the switching control means for the controlled object if a power supply condition is satisfied, and to turn off the switching control means for the controlled object if the power supply condition is not satisfied, thereby controlling ON and OFF of the switching control means in the next control cycle for all of the controlled objects, and wherein the power supply condition is that the intermediate integrated power value of the controlled object is greater than a predetermined threshold, and if the power is to be supplied to the controlled object, a sum total of the power value of the controlled object estimated by the power estimation means and the power values of other controlled objects estimated by the power estimation means and determined to be powered in the next control cycle does not exceed the upper limit value calculated by the upper limit value calculation means.

The power control device according to the present invention is configured such that the upper limit value calculation means adds a predetermined correction value to the sum total of the target power values of the respective controlled objects calculated by the target power value calculation means, so as to calculate the upper limit value of the supplied power value.

The power control device according to the present invention is configured such that the upper limit value calculation means multiplies a predetermined coefficient and the sum total of the target power values of the respective controlled objects calculated by the target power value calculation means, so as to calculate the upper limit value of the supplied power value.

The power control device according to the present invention is configured such that the upper limit value calculation means divides a sum total of the power difference integrated values of the respective controlled objects calculated by the intermediate integrated power value calculation means by a predetermined integral time, and then, adds the division result as a correction value to the sum total of the target power values of the respective controlled objects calculated by the target power value calculation means, so as to calculate the upper limit value of the supplied power value.

The power control device according to the present invention is configured such that the upper limit value calculation means divides a difference between the sum total of the power difference integrated values of the respective controlled objects calculated by the intermediate integrated power value calculation means and a sum total of thresholds for the respective controlled objects, by a predetermined integral time, and then, adds the division result as the correction value to the sum total of the target power values of the respective controlled objects calculated by the target power value calculation means, so as to calculate the upper limit value of the supplied power value.

The power control device according to the present invention is configured such that the correction value added by the upper limit value calculation means is within a range from zero value to the maximum value of power supplied to the respective controlled objects.

The power control device according to the present invention is configured such that the upper limit value calculation means adds either of the correction value within the range from zero value to the maximum value of power supplied to the respective controlled objects or the correction value that is the result from the division by the predetermined integral time, to the sum total of the target power values of the respective controlled objects calculated by the target power value calculation means, thereby calculating the upper limit value of the supplied power value.

A power control method according to the present invention comprises:

a plurality of switching steps in which a plurality of switching control means switch on and off power supplied to respective controlled objects at time intervals of predetermined unit time;

a target power value calculation step in which a target power value calculation means calculates a target power value that is a target value of the power supplied to each controlled object;

an output power value calculation step in which an output power value calculation means calculates an output power value that is a value of the power supplied to each controlled object;

a power estimation step in which a power estimation means estimates, for each controlled object, from the output power value calculated in the output power value calculation step while the power is supplied, a power value when the power is supplied to the controlled object within the unit time in the next control cycle;

an intermediate integrated power value calculation step in which an intermediate integrated power value calculation means calculates a power difference integrated value by repeating an addition of the target power value calculated in the target power value calculation step and a subtraction of the output power value calculated in the output power value calculation step in every control cycle, and adds the power difference integrated value up to the previous control cycle and the target power value in the next control cycle calculated in the target power value calculation step, so as to calculate, for each controlled object, the added value that is the latest intermediate integrated power value;

an upper limit value calculation step in which an upper limit value calculation means calculates an upper limit value of supplied power values for all of the controlled objects per unit time, based on a sum total of the target power values of the respective controlled objects calculated in the target power value calculation step; and a power control step in which a power control means repeats, with respect to the respective controlled objects in order beginning with a controlled object having a larger intermediate integrated power value calculated in the intermediate integrated power value calculation step, the control to turn on the switching control means for the controlled object if a power supply condition is satisfied, and to turn off the switching control means for the controlled object if the power supply condition is not satisfied, thereby controlling ON and OFF of the switching control means in the next control cycle for all of the controlled objects, wherein the power supply condition is that the intermediate integrated power value of the controlled object is greater than a predetermined threshold, and if the power is to be supplied to the controlled object, a sum total of the power value of the controlled object estimated in the power estimation step and the power values of other controlled objects estimated in the power estimation step and determined to be powered in the next control cycle does not exceed the upper limit value calculated in the upper limit value calculation step.

Effect of the Invention

The present invention provides an effect in which the upper limit value of the supplied power value may be appropriately calculated depending on a change in the total target power value, and as a result, loss in controllability associated with the change in the total target power value may be prevented, and the power supply voltage fluctuation may be suppressed.

The present invention also provides an effect of saving time to set the upper limit value by a user.

BRIEF DESCRIPTION OF THE DRAWINGS

FIG. 5 is a schematic diagram showing examples of control in respective control cycles in a time-divisional output control mode.

MODE FOR CARRYING OUT THE INVENTION

Embodiment 1

Figure 1:
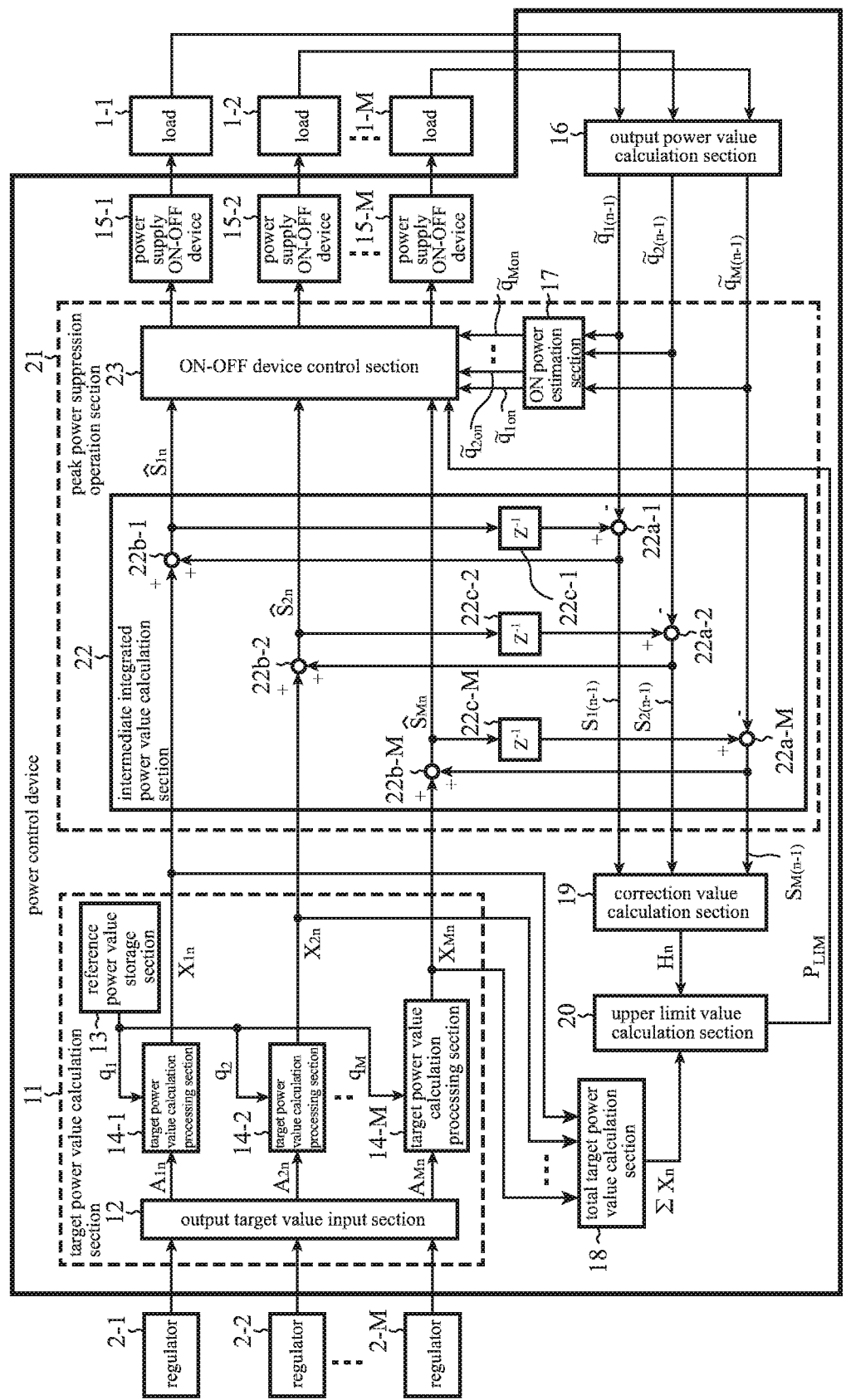
FIG. 1 is a block diagram showing a power control device according to Embodiment 1 of the present invention.

FIG. 1 is a block diagram showing the power control device according to Embodiment 1 of the present invention.

The power control device in FIG. 1 shows an example for time-divisionally controlling the supply of power to M controlled objects (M is an integer equal to or greater than 2).

That is, the power control device in FIG. 1 controls ON and OFF of power supplied to the controlled objects at time intervals corresponding to an integral multiple a half cycle of a power source waveform (hereinafter referred to as "unit time"), and supplies to the controlled object the power proportional to a manipulated signal (target value) output from a PID controller by controlling a time rate of ON time during which the power is supplied to OFF time during which the power is not supplied.

A cycle for repeating the control to turn on and off the power supplied to the controlled objects in every unit time is hereinafter referred to as "control cycle".

In FIG. 1, loads 1-1 to 1-M are controlled objects for the power control device, such as a heater.

Regulators 2-1 to 2-M are external devices for the power control device, and output an output target value $A_{mn}$ for the power supplied to the load 1-m to the power control device in every control cycle n.

Incidentally, m is a number for identifying a controlled object among the loads 1-1 to 1-M, and m is 1, 2, . . . , M.

Further, n is a number for identifying the control cycle for supplying the power to the loads 1-1 to 1-M, and an amount of time in one control cycle conforms to the above unit time. Incidentally, n is 1, 2, . . . .

In every control cycle n, a target power value calculation section 11 inputs a value output from the regulator 2-m at the beginning of the control cycle n as the output target value $A_{mn}$ (for example, a percentage of target power relative to rated power of the load 1-m), multiplies the output target value $A_{mn}$ by a predetermined reference power value, and then, calculates the multiplication result $x_{mn}$ (=$A_{mn} \cdot q_m$) as a target power value $x_{mn}$ supplied to the load 1-m in the control cycle n. Incidentally, the target power value calculation section 11 constitutes the target power value calculation means.

An output target value input section 12 in the target power value calculation section 11 is an interface device for the regulators 2-1 to 2-M, and inputs the output target value $A_{mn}$ output from the regulator 2-m.

A reference power value storage section 13 is comprised of a memory such as RAM, and stores a reference power value $q_m$ of the load 1-m (e.g., rated power of the load 1-m).

Target power value calculation processing sections 14-1 to 14-M are comprised of, for example, multipliers, and in every control cycle n, calculate a target power value $x_{mn}$ of the load 1-m by multiplying the output target value $A_{mn}$ input by the output target value input section 12 at the beginning of the control cycle n by the reference power value $q_m$ stored in the reference power value storage section 13.

Power supply ON-OFF devices 15-1 to 15-M are comprised of, for example, thyristors, and under the instructions of a peak power suppression operation section 21, turn on and off the power supplied to the load 1-m in every control cycle (unit time). The power supply ON-OFF devices 15-1 to 15-M constitute the switching control means.

An output power value calculation section 16 is comprised of, for example, a semiconductor integrated circuit implementing a CPU, or a one-chip microcomputer, and calculates an output power value $q_{mn}$ tilde that is a value of the power supplied to the load 1-m, during the unit time of the control cycle n. The output power value calculation section 16 constitutes the output power value calculation means.

In FIG. 1, $q_{mn}$ with a symbol "~" attached thereon is shown as the output power value. However, since this symbol "~" cannot be attached on $q_{mn}$ in the text of the specification in relation to electronic patent application, it is expressed as "$q_{mn}$ tilde" in the text.

In every control cycle n, a value output from the output power value calculation section 16 to the peak power suppression operation section 21 at the beginning of control cycle n is an output power value $q_{m(n-1)}$ tilde calculated in the previous control cycle (n−1).

The output power value calculation section 16 may have any configuration as long as it may calculate the output power value $q_{mn}$ tilde in each unit time of the control cycle n. For example, it may comprise a voltage measurement means measuring voltage $V_{mn}$ applied to the load 1-m, a current measurement means measuring current $I_{mn}$ flowing through the load 1-m, and a calculation means calculating, from the voltage $V_{mn}$ and current $I_{mn}$, the output power value $q_{mn}$ tilde that is a value of the power supplied to the load 1-m.

An ON power estimation section 17 is comprised of, for example, a semiconductor integrated circuit implementing a CPU, or a one-chip microcomputer. It stores the output power value during the ON time measured by the output power value calculation section 16 during previous supply of power to the load 1-m, estimates, based on the output power value, the power value when the power is supplied to the load 1-m, during the unit time of the control cycle n, and outputs the power estimated value $q_{mon}$ tilde. The ON power estimation section 17 constitutes the power estimation means.

A total target power value calculation section 18 is comprised of, for example, an adder, and calculates a sum total $\Sigma x_n$ of target power values $x_{1n}$ to $x_{Mn}$ of the loads 1-1 to 1-M calculated by the target power value calculation processing sections 14-1 to 14-M.

A correction value calculation section 19 is comprised of, for example, a semiconductor integrated circuit implementing a CPU, or a one-chip microcomputer, and calculates a correction value $H_n$ to be added to the sum total $\Sigma x_n$ of target power values $x_{1n}$ to $x_{Mn}$ calculated by the total target power value calculation section 18.

An upper limit value calculation section 20 is comprised of, for example, an adder. It adds the correction value $H_n$ calculated by the correction value calculation section 19 to the sum total $\Sigma x_n$ of target power values $x_{1n}$ to $x_{Mn}$ calculated by the total target power value calculation section 18, thereby calculating an upper limit value $P_{LIM}$ of the supplied power values for all of M loads in the unit time of the control cycle n (hereinafter referred to as "power upper limit value $P_{LIM}$").

The total target power value calculation section 18, correction value calculation section 19, and upper limit value calculation section 20 constitute the upper limit value calculation means.

A peak power suppression operation section 21 is comprised of the ON power estimation section 17, intermediate integrated power value calculation section 22, and ON-OFF device control section 23.

The intermediate integrated power value calculation section 22 is comprised of subtracters 22a-1 to 22a-M, adders 22b-1 to 22b-M, and buffers $(Z^{-1})$ 22c-1 to 22c-M which mean that values are time-shifted by one control cycle. The intermediate integrated power value calculation section 22 subtracts the output power value $q_{m(n-1)}$ tilde calculated by the output power value calculation section 16 from an intermediate integrated power value $S_{m(n-1)}$ hat calculated in the previous control cycle (n−1), thereby calculating a power difference integrated value $s_{m(n-1)}$ (=$s_{m(n-1)}$ hat−$q_{m(n-1)}$ tilde) in the previous control cycle (n−1); and then adds the power difference integrated value $S_{m(n-1)}$ to the target power value $x_{mn}$ calculated by the target power value calculation processing section 14-m, to calculate the additional value, i.e., the latest intermediate integrated power value $s_{mn}$ hat. The intermediate integrated power value calculation section 22 constitutes the intermediate integrated power value calculation means.

In FIG. 1, $S_{mn}$ with a symbol "^" attached thereon is shown as the intermediate integrated power value. However, since this symbol "^" cannot be attached on $S_{mn}$ in the text of the specification in relation to electronic patent application, it is expressed as "$s_{mn}$ hat".

The ON-OFF device control section 23 repeats, with respect to the loads 1-1 to 1-M in order beginning with the load 1-m having a larger intermediate integrated power value $S_{mn}$ hat calculated by the intermediate integrated power value calculation section 22, the control to turn on the power supply ON-OFF device 15-m for the load 1-m if the power supply condition is satisfied and to turn off the power supply ON-OFF device 15-m for the load 1-m if the power supply condition is not satisfied, thereby controlling ON and OFF of the power supply ON-OFF devices 15 in the next control cycle for all of the loads, wherein the power supply condition is that the intermediate integrated power value $s_{mn}$ hat of the load 1-m is greater than the predetermined threshold $s_{th}$, and the sum total of the power estimated value $q_{mon}$ tilde of the load 1-m estimated by the ON power estimation section 17 and power estimated values $q_{mon}$ tilde of loads determined to be turned on in the next control cycle among power estimated values $q_{1on}$ tilde to $q_{Mon}$ tilde of the loads 1-1 to 1-M estimated by the ON power estimation section 17 does not exceed the power upper limit value $P_{LIM}$ calculated by the upper limit value calculation section 20. The ON-OFF device control section 23 constitutes the control means.

In the example of FIG. 1, components of the power control device: the target power value calculation section 11, power supply ON-OFF devices 15-1 to 15-M, output power value calculation section 16, ON power estimation section 17, total target power value calculation section 18, correction value calculation section 19, upper limit value calculation section 20, intermediate integrated power value calculation section 22, and ON-OFF device control section 23 are assumed to be composed of dedicated hardware, respectively. However, the power control device, in whole or in part, may be composed of a computer.

If the entire power control device is composed of a computer, a program descriptive of processing details of the target power value calculation section 11, power supply ON-OFF devices 15-1 to 15-M, output power value calculation section 16, ON power estimation section 17, total target power value calculation section 18, correction value calculation section 19, upper limit value calculation section 20, intermediate integrated power value calculation section 22, and ON-OFF device control section 23 may be stored in computer memory, such that a CPU of the computer may execute the program stored in the memory.

Figure 2:
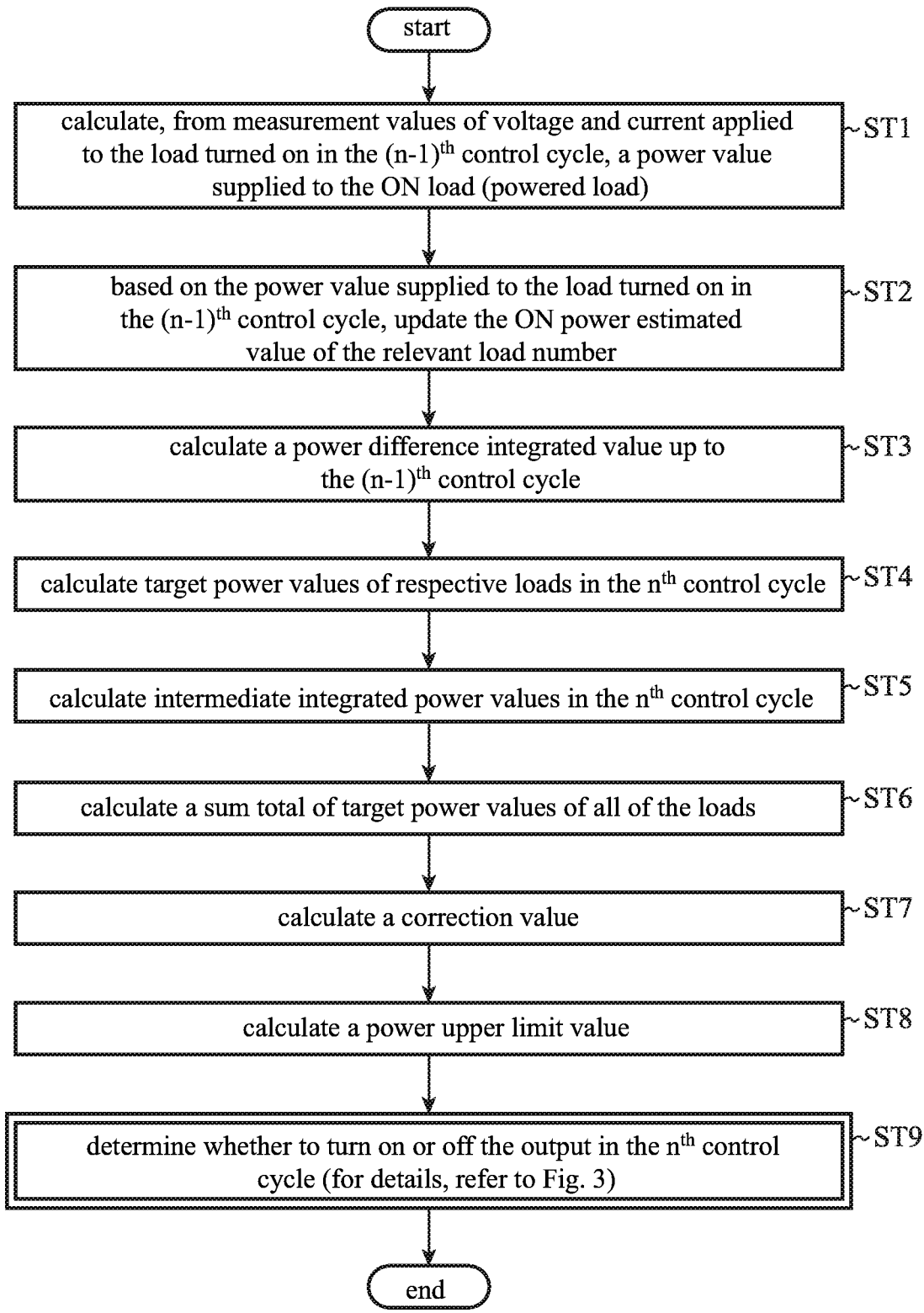
FIG. 2 is a flowchart showing processing details by the power control device according to Embodiment 1 of the present invention.

FIG. 2 is a flowchart showing processing details by the power control device according to Embodiment 1 of the present invention.

Figure 3:
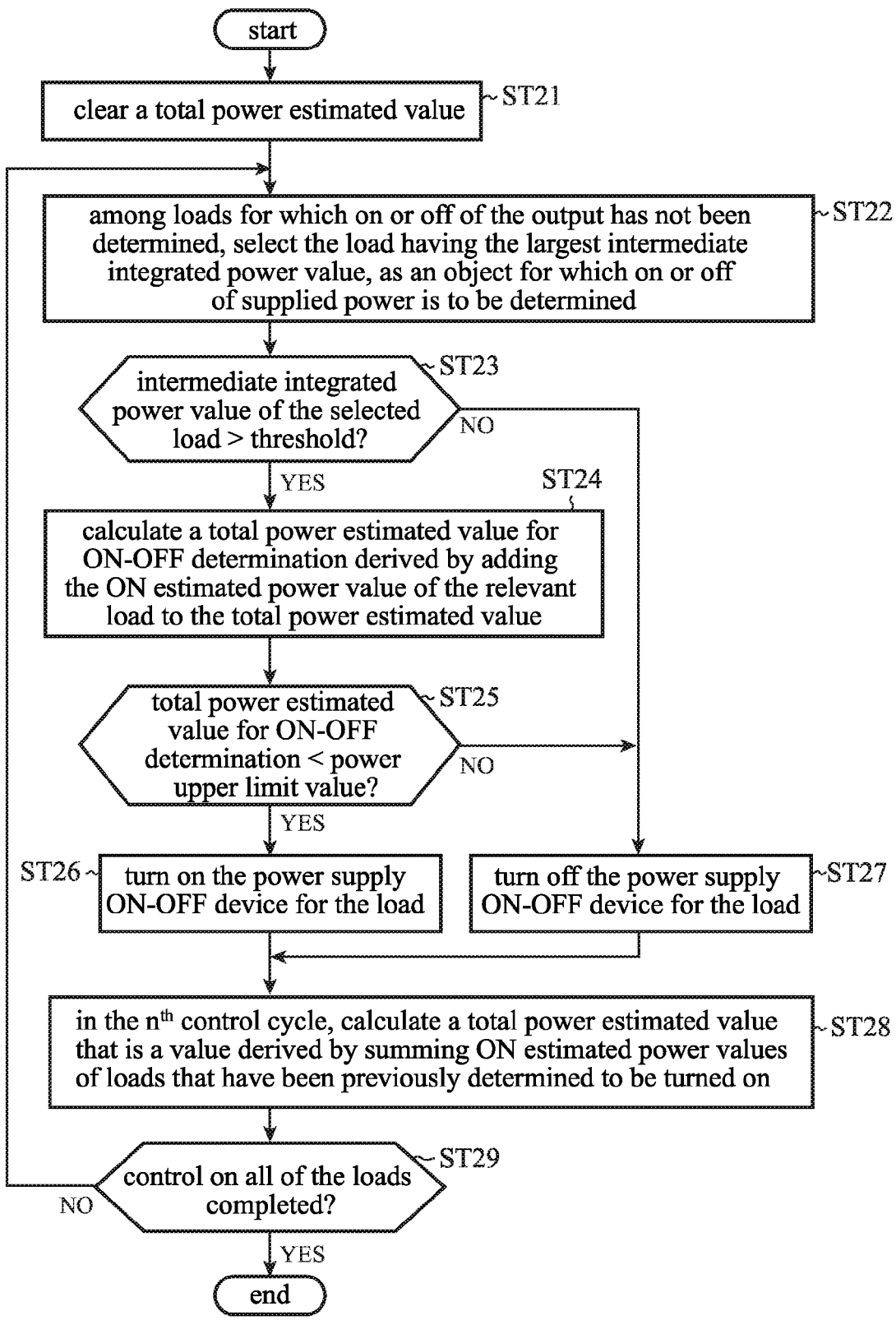
FIG. 3 is a flowchart showing processing details by an ON-OFF device control section 23 of the power control device according to Embodiment 1 of the present invention.

FIG. 3 is a flowchart showing processing details by the ON-OFF device control section 23 of the power control device according to Embodiment 1 of the present invention.

The operation is described below.

With a power control device for conventional peak power suppression control, as stated above, the total output power value for a plurality of channels is suppressed to or below a preset power upper limit value in each unit time. However, the power upper limit value is a preset fixed value, and its setting is not automatically changed appropriately.

The power control device of this Embodiment 1 automatically calculates an appropriate power upper limit value $P_{LIM}$ without manual setting by a user.

This allows for prevention of the loss in controllability associated with the change in the total target power value, as well as suppression of the power supply voltage fluctuation, as described in detail below.

Figures 4, 5A:
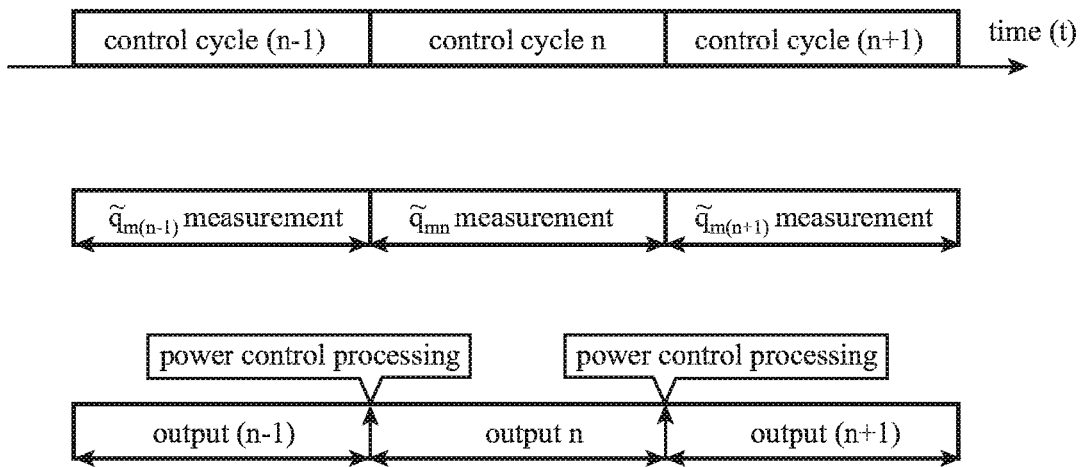
FIG. 4 is a schematic diagram showing processing timing of the power control device.

In this Embodiment 1, power control in the $n^{th}$ control cycle is described. FIG. 4 is a schematic diagram showing processing timing of the power control device. It shows that processing in the $n^{th}$ control cycle is performed around a boundary between the $(n-1)^{th}$ control cycle and the $n^{th}$ control cycle. Described below is the processing for the $n^{th}$ control cycle conducted at the beginning of the $n^{th}$ control cycle.

The power supply ON-OFF device 15-m (m=1, 2, ..., M) controls ON and OFF of power supplied to the load 1-m under the instruction of the ON-OFF device control section 23 in the peak power suppression operation section 21, and if the instruction of the ON-OFF device control section 23 to the power supply ON-OFF device 15-m for the load 1-m is ON in processing in the $n^{th}$ control cycle, the power is supplied to the load 1-m during the $n^{th}$ control cycle.

On the other hand, if the instruction of the ON-OFF device control section 23 to the power supply ON-OFF device 15-m for the load 1-m is OFF in processing in the $n^{th}$ control cycle, the power is not supplied to the load 1-m during the $n^{th}$ control cycle.

In processing in the $n^{th}$ control cycle, the output power value calculation section 16 calculates an output power value $q_{m(n-1)}$ tilde that is a value of power supplied to the load 1-m during the unit time of the control cycle n-1 (Step ST1 in FIG. 2).

That is, if the output power value calculation section 16 comprises, for example, a voltage measurement means measuring voltage $V_{m(n-1)}$ applied to the load 1-m, and a current measurement means measuring current $I_{m(n-1)}$ flowing through the load 1-m, it calculates, at the beginning of the $n^{th}$ control cycle, the output power value $q_{m(n-1)}$ tilde that is a value of power supplied to the load 1-m, based on the voltage $V_{m(n-1)}$ measured by the voltage measurement means and the current $I_{m(n-1)}$ measured by the current measurement means in the $(n-1)^{th}$ control cycle.

$$\tilde{q}_{m(n-1)} = V_{m(n-1)} \times I_{m(n-1)} \quad (1)$$

The ON power estimation section 17 stores the output power values calculated by the output power value calculation section 16 when the power is supplied to the loads 1-1 to 1-M (stores the output power values for every loads). In the $n^{th}$ control cycle, if the output power value $q_{m(n-1)}$ tilde calculated at the beginning of the $n^{th}$ control cycle is not zero (the power was supplied to the load 1-m), it updates the stored output power value (Step ST2). If the output power value $q_{m(n-1)}$ tilde calculated in the $(n-1)^{th}$ control cycle is zero, it does not update the stored output power value.

In the $n^{th}$ control cycle, based on the stored output power value, the ON power estimation section 17 estimates, at the beginning of the $n^{th}$ control cycle, a power value for the case of power supply to the load 1-m during the unit time of the $n^{th}$ control cycle, and then, outputs the power estimated value $q_{mon}$ tilde to the ON-OFF device control section 23 (Step ST2).

For example, if the power is supplied to the load 1-m in the $(n-1)^{th}$ control cycle, the output power value $q_{m(n-1)}$ tilde calculated at the beginning of the $n^{th}$ control cycle is output to the ON-OFF device control section 23 as the power estimated value $q_{mon}$ tilde of the load 1-m.

For example, if the power is not supplied to the load 1-m in in the $(n-1)^{th}$ control cycle but the power is supplied to the load 1-m in the $(n-2)^{th}$ control cycle, the output power value $q_{m(n-2)}$ tilde calculated at the beginning of the $(n-1)^{th}$ control cycle is output to the ON-OFF device control section 23 as the power estimated value $q_{mon}$ tilde of the load 1-m.

In the $n^{th}$ control cycle, upon receiving the output power value $q_{m(n-1)}$ tilde from the output power value calculation section 16, the subtracter 22a-m in the intermediate integrated power value calculation section 22 subtracts the output power value $q_{m(n-1)}$ tilde from a value through a buffer $(Z^{-1})$ 22c-m meaning that a value is time-shifted by one control cycle (intermediate integrated power value $s_{m(n-1)}$ hat calculated in the $(n-1)^{th}$ control cycle), thereby calculating a power difference integrated value $s_{m(n-1)}$ up to the $(n-1)^{th}$ control cycle, and then, outputting the power difference integrated value $s_{m(n-1)}$ to the correction value calculation section 19 and adder 22b-m (Step ST3).

$$s_{m(n-1)} = \hat{s}_{m(n-1)} - \tilde{q}_{m(n-1)} \quad (2)$$

At the beginning of the $n^{th}$ control cycle, the output target value input section 12 in the target power value calculation section 11 inputs the output target value $A_{mn}$ for the power supplied to the load 1-m which is output from the regulator 2-m, and outputs the output target value $A_{mn}$ to the target power value calculation processing section 14-m.

In the $n^{th}$ control cycle, upon receiving the output target value $A_{mn}$ from the output target value input section 12, the target power value calculation processing section 14-m in the target power value calculation section 11 multiplies the reference power value $q_m$ stored by the reference power value storage section 13 by the output target value $A_{mn}$, thereby calculating the target power value $x_{mn}$ of the load 1-m, and outputting the target power value $x_{mn}$ to the peak power suppression operation section 21 and total target power value calculation section 18 (Step ST4). While the reference power value $q_m$ is assumed to be the rated power of the load 1-m herein, it is not limited thereto.

$$x_{mn} = A_{mn} \times q_m \quad (3)$$

In the $n^{th}$ control cycle, when the subtracter 22a-m calculates the power difference integrated value $s_{m(n-1)}$ up to the $(n-1)^{th}$ control cycle, the adder 22b-m in the intermediate integrated power value calculation section 22 adds the power difference integrated value $s_{m(n-1)}$ to the target power value $x_{mn}$ calculated by the target power value calculation processing sections 14-1 to 14-M, thereby calculating the intermediate integrated power value $s_{mn}$ hat at the $n^{th}$ control cycle, and outputting the intermediate integrated power value $s_{mn}$ hat to the ON-OFF device control section 23 and buffer $(Z^{-1})$ 22c-m (Step ST5). $Z^{-1}$ in the buffer $(Z^{-1})$ 22c-m is an operator which means time-shift of values by one control cycle, and its output is the intermediate integrated power value $s_{m(n-1)}$ hat calculated in the $(n-1)^{th}$ control cycle.

$$\hat{s}_{mn} = s_{m(n-1)} + x_{mn} \quad (4)$$

In the $n^{th}$ control cycle, when the target power value calculation processing sections 14-1 to 14-M calculate the target power values $x_{1n}$ to $x_{Mn}$ of the loads 1-1 to 1-M, the total target power value calculation section 18 calculates a sum total $\Sigma x_n$ of the target power values $x_{1n}$ to $x_{Mn}$ (Step ST6).

$$\Sigma x_n = x_{1n} + x_{2n} + \ldots + x_{Mn} \quad (5)$$

In the $n^{th}$ control cycle, the correction value calculation section 19 calculates a correction value $H_n$ to be added to the sum total $\Sigma x_n$ of the target power values $x_{1n}$ to $x_{Mn}$ calculated by the total target power value calculation section 18 (Step ST7).

Details for calculation of the correction value $H_n$ by the correction value calculation section 19 are described below. Given that a value derived by adding an appropriate correction value $H_n$ to the sum total $\Sigma x_n$ of the target power values $x_{1n}$ to $x_{Mn}$ is the power upper limit value $P_{LIM}$, the difference between the maximum and minimum values of the total output power values in every unit time may be small, thereby suppressing the loss in controllability or the power supply voltage fluctuation (details for which are described below).

In the $n^{th}$ control cycle, the upper limit value calculation section 20 adds the correction value $H_n$ calculated by the correction value calculation section 19 to the sum total $\Sigma x_n$ of the target power values $x_{1n}$ to $x_{Mn}$ calculated by the total target power value calculation section 18, thereby calculating the power upper limit value $P_{LIM}$ for M loads 1-1 to 1-M (Step ST8).

$$P_{LIM} = \Sigma x_n + H_n \quad (6)$$

The ON-OFF device control section 23 in the peak power suppression operation section 21 determines whether to turn on or off the power supply ON-OFF device 15-m in the $n^{th}$ control cycle (Step ST9).

With reference to the flowchart in FIG. 3, the specific processing details of the ON-OFF device control section 23 in the peak power suppression operation section 21 are described below.

The ON-OFF device control section 23 in the peak power suppression operation section 21 clears a total power estimated value $\Sigma q_{on}$ described below in each control cycle as an initializing process (Step ST21 in FIG. 3).

In the $n^{th}$ control cycle, when the ON-OFF device control section 23 receives, from the intermediate integrated power value calculation section 22, the intermediate integrated power values $s_{1n}$ hat to $s_{Mn}$ hat of the loads 1-1 to 1-M, it compares M intermediate integrated power values $s_{1n}$ hat to $s_{Mn}$ hat, sorts the M intermediate integrated power values $s_{1n}$ hat to $s_{Mn}$ hat in descending order, and sets loads 1-m as the controlled objects in order, beginning with the load 1-m having a larger intermediate integrated power value than the others.

That is, among loads 1-m not yet selected as the controlled objects, the load 1-m having the largest intermediate integrated power value $s_{mn}$ hat is selected as the controlled object (Step ST22).

For example, if the number of loads is three, and an inequality: the intermediate integrated power value $s_{1n}$ hat > intermediate integrated power value $s_{2n}$ hat > intermediate integrated power value $s_{3n}$ hat holds, "the load 1-1", "the load 1-2", and "the load 1-3" are selected as the controlled objects in this order.

Also, for example, if an inequality: the intermediate integrated power value $s_{3n}$ hat > intermediate integrated power value $s_{1n}$ hat > intermediate integrated power value $s_{2n}$ hat holds, "the load 1-3", "the load 1-1", and "the load 1-2" are selected as the controlled objects in this order.

When the load 1-m is selected as the controlled object, the ON-OFF device control section 23 compares the intermediate integrated power value $s_{mn}$ hat of the load 1-m and a predetermined threshold $s_{th}$ (Step ST23). If the intermediate integrated power value $s_{mn}$ hat of the load 1-m is larger than the predetermined threshold $s_{th}$, the ON-OFF device control section 23 calculates a total power estimated value $\Sigma q_{on}'$ for ON-OFF determination derived by adding the power estimated value $q_{mon}$ tilde of the load 1-m to the total power estimated value $\Sigma q_{on}$ described below (Step ST24).

Further, when the load 1-m is selected as the controlled object, the ON-OFF device control section 23 determines whether the power supply condition that the intermediate integrated power value $s_{mn}$ hat of the load 1-m is larger than the predetermined threshold $s_{th}$ (Step ST23) and the total power estimated value $\Sigma q_{on}'$ for ON-OFF determination does not exceed the power upper limit value $P_{LIM}$ calculated by the upper limit value calculation section 20 (Step ST25) is satisfied or not. That is, it determines whether the following formulae (7) and (8) hold or not.

$$s_{mn} > s_{th} \quad (7)$$

$$\Sigma q_{on}' \leq P_{LIM} \quad (8)$$

If the formulae (7) and (8) hold, the above power supply condition is satisfied, and thus, the ON-OFF device control section 23 turns on the power supply ON-OFF device 15-m for the load 1-m (Step ST26). This allows for the power to be supplied to the load 1-m.

If at least one of the formulae (7) and (8) does not hold, the above power supply condition is not satisfied, and thus, the ON-OFF device control section 23 turns off the power supply ON-OFF device 15-m for the load 1-m (Step ST27). Therefore, the power is not supplied to the load 1-m.

In the $n^{th}$ control cycle, the ON-OFF device control section 23 calculates the sum total of the power estimated values $q_{mon}$ tilde of the loads 1-1 to 1-M estimated by the ON power estimation section 17 (hereinafter referred to as "total power estimated value $\Sigma q_{on}$") (Step ST28).

The ON-OFF device control section 23 sets the loads 1-m as the controlled objects in order, beginning with the load 1-m having a larger intermediate integrated power value than the others, and repeats the above control processing (Steps ST22 to ST28) until the control over all of the loads 1-m is completed (Step ST29).

The above is the processing details in the $n^{th}$ control cycle.

In this Embodiment 1, by turning on the power supply ON-OFF device 15-m for the load 1-m if the power supply condition that the total power estimated value $\Sigma q_{on}$ does not exceed the power upper limit value $P_{LIM}$ calculated by the upper limit value calculation section 20 is satisfied, the sum total of the output power values $q_{mn}$ tilde is suppressed not to exceed the power upper limit value $P_{LIM}$ in the unit time of each control cycle. However, unlike the conventional time-divisional output control, an appropriate power upper limit value $P_{LIM}$ (value derived by adding an appropriate correction value $H_n$ to the sum total $\Sigma x_n$ of the target power values $x_{1n}$ to $x_{Mn}$) may be automatically calculated. Thus, the obtained effect is that the loss in controllability associated with the change in total target power value may be prevented, and the power supply voltage fluctuation may be suppressed.

The reason why the above effect may be obtained is described below.

First, the principle that an integrated value of the target power values $x_{mn}$ conforms to an integrated value of the output power values $q_{mn}$ tilde by the time-divisional output control mode is described.

In the power control device shown in FIG. 1, if the intermediate integrated power value $s_{mn}$ hat of the load 1-m exceeds the threshold $s_{th}$, thereby satisfying the power supply condition, the power supply ON-OFF device 15-m for the load 1-m is turned on, and the output power value $q_{mn}$ tilde is subtracted from the intermediate integrated power value $s_{mn}$ hat of the load 1-m. Thus, the power difference integrated value $s_{mn}$ of the load 1-m is a finite value between the value derived by subtracting the output power value $q_{mn}$ tilde from the threshold $s_{th}$ and the threshold $s_{th}$ itself.

The power difference integrated value $s_{mn}$ of the load 1-m may be divided into the integrated value of target power values $x_{mn}$ and the integrated value of output power values $q_{mn}$ tilde. If the ON-OFF process by the ON-OFF device control section 23 is repeated and then the number of repetition n is a sufficiently large value, the integrated value of target power values $x_{mn}$ and the integrated value of output power values $q_{mn}$ tilde become very large values.

As a result, the power difference integrated value $s_{mn}$ becomes a sufficiently small value compared to the integrated value of target power values $x_{mn}$ and the integrated value of output power values $q_{mn}$ tilde, and thus, the integrated value of target power values $x_{mn}$ becomes substantially equal to the integrated value of output power values $q_{mn}$ tilde.

Numerical formulae representing that when the number of repetition n is infinite, the target power value $x_{mn}$ conforms to the output power value $q_{mn}$ tilde are as follows:

$$s_{mn} = \lim_{n \to \infty}\left(\sum_{i=1}^{n} x_{mi} \cdot q - \sum_{i=1}^{n} \tilde{q}_{mi}\right) = \lim_{n \to \infty}\left(\sum_{i=1}^{n} x_{mi} \cdot q\right) - \lim_{n \to \infty}\left(\sum_{i=1}^{n} \tilde{q}_{mi}\right) \quad (9)$$

$$\therefore s_{th} - \tilde{q}_{mn} \leq \lim_{n \to \infty}\left(\sum_{i=1}^{n} x_{mi} \cdot q\right) - \lim_{n \to \infty}\left(\sum_{i=1}^{n} \tilde{q}_{mi}\right) \leq s_{th}$$

$$\text{And, } \lim_{n \to \infty}\left(\sum_{i=1}^{n} x_{mi} \cdot q\right) = \infty, \lim_{n \to \infty}\left(\sum_{i=1}^{n} \tilde{q}_{mi}\right) = \infty$$

$$\therefore \lim_{n \to \infty}\left(\sum_{i=1}^{n} x_{mi} \cdot q\right) \approx \lim_{n \to \infty}\left(\sum_{i=1}^{n} \tilde{q}_{mi}\right)$$

FIG. 5 is a schematic diagram showing examples of control in respective control cycles in a time-divisional output control mode. FIG. 5 represents the target power values, intermediate integrated power values, actual power values (output power values), and power difference integrated values in percent, with the assumption that the rated power of the load is 100%.

For example, if the target power value is set to 30% of the rated power of the load, it is found that, as shown in FIG. 5(a), the average of actual power values (output power values) is controlled to be 30%.

Further, if the target power value is set to 55% of the rated power of the load, it is found that, as shown in FIG. 5(b), the average of actual power values (output power values) is controlled to be 55%.

By an operation in the above described time-divisional output control mode, the difference between the integrated value of target power values in respective unit time (hereinafter referred to as "target power integrated value") and the integrated value of output power values in respective unit time (hereinafter referred to as "output power integrated value") (this difference is hereinafter referred to as "power difference integrated value") is smaller than the predetermined threshold, and is larger than the value derived by subtracting, from the threshold, the power value upon being turned on.

Therefore, when the plurality of loads are controlled in the time-divisional output control mode, the difference between a total value of the target power integrated values for all of the loads (hereinafter referred to as "total target power integrated value") and a total value of the output power integrated values for all of the loads (hereinafter referred to as "total output power integrated value") (this difference is hereinafter referred to as "total power difference integrated value") is smaller than a value derived by adding the thresholds for all of the loads (hereinafter referred to as "total threshold"), and is larger than the value derived by subtracting, from the total threshold, the total value of power when power is supplied to all of the loads (hereinafter referred to as "total ON power value").

Figure 7:
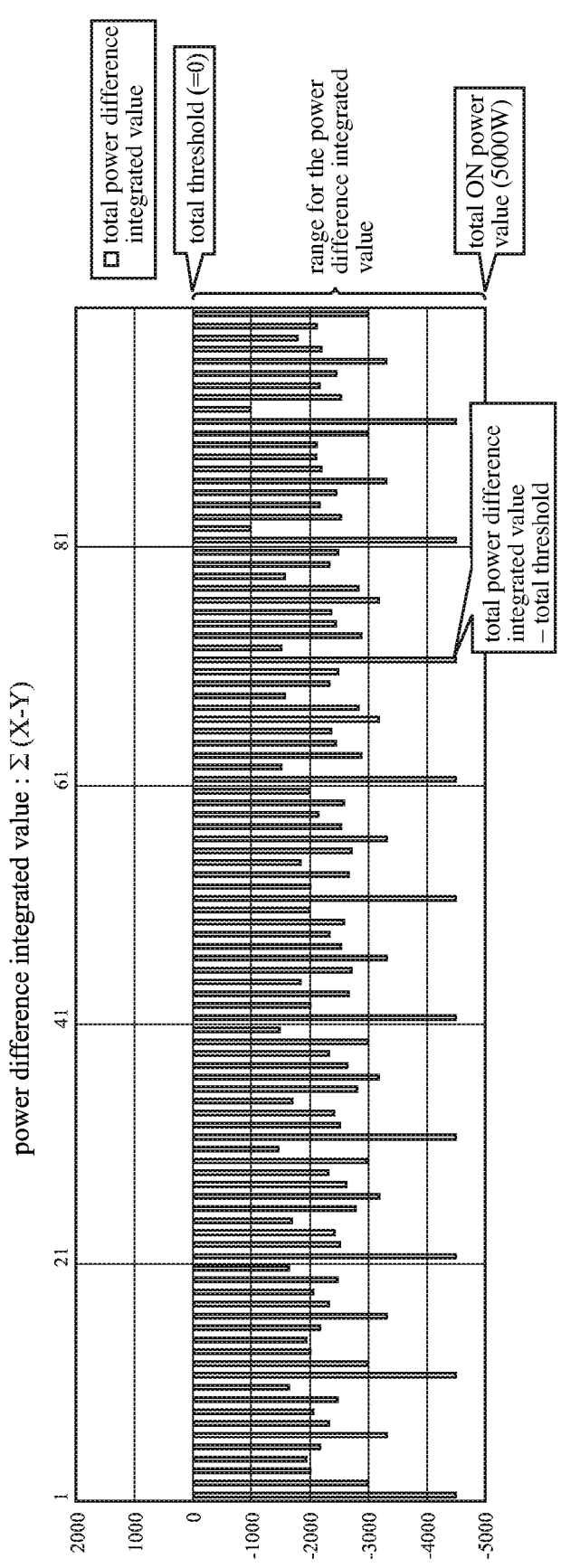
FIG. 7 is a schematic diagram showing one example of total power difference integrated values when no power upper limit value is set.

FIG. 7 is a schematic diagram showing one example of the total power difference integrated value when no power upper limit value is set, and shows the above state.

In order to clarify the operating principle, the following explanation relates to cases in which the threshold is zero. However, the threshold is not necessarily zero.

In the time-divisional output control mode, the output is either ON or OFF as described above, and the total value of consumed power for the ON channels (loads) is the total output power value. Thus, the total output power values will be discrete values.

On the other hand, the output target values sent from a temperature regulator, etc. are continuous values calculated through a PID operation, etc., and thus, the target power values calculated from the output target values are also continuous values. Therefore, total target power values which are values derived from adding the target power values for all of channels are also continuous values.

Figure 6:
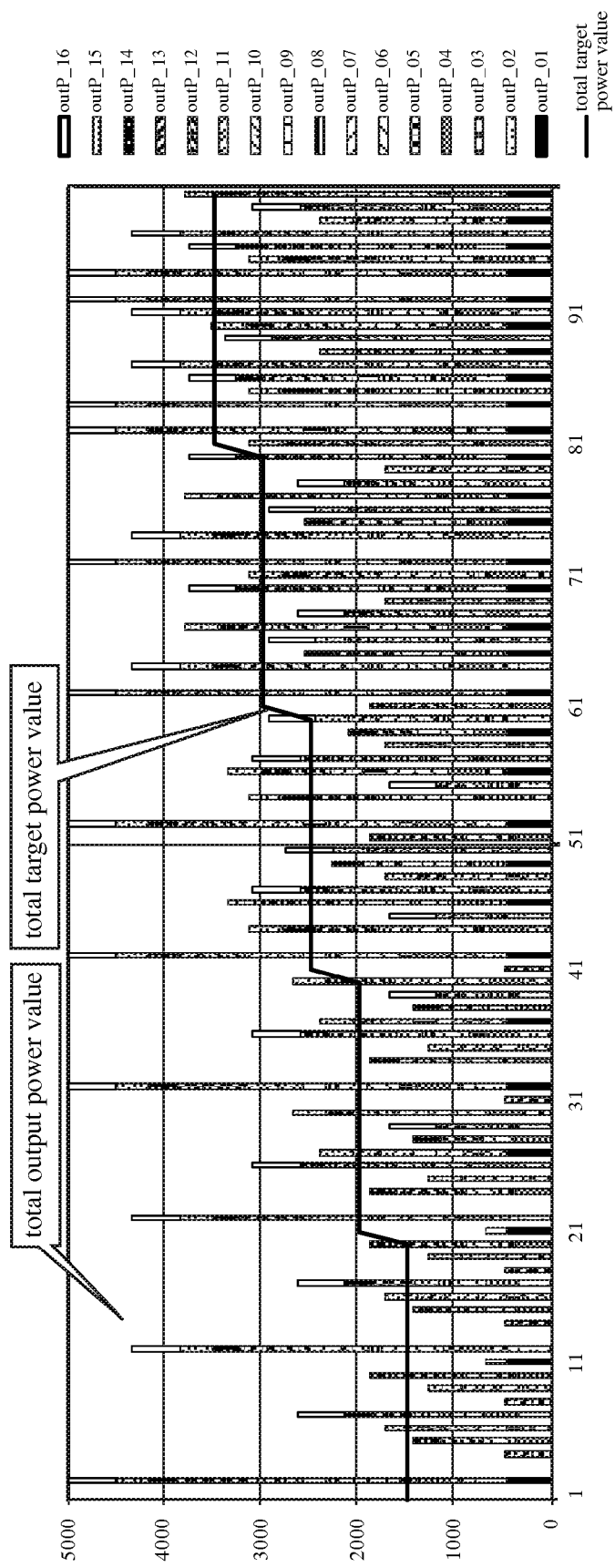
FIG. 6 is a schematic diagram showing one example of ON/OFF states of 16 channels when power control is performed on the channels in the time-divisional output control mode.

For the above reason, the total target power value does not conform to the total output power value with some exceptions. For example, in FIGS. 6 and 8, the total output power value is large or small relative to the total target power value in a repetitive manner, but the total output power integrated value and total target power integrated value are controlled to substantially conform to each other.

Then, in the peak power suppression control mode, the concept of power upper limit value is introduced, and the total value of output power values of channels simultaneously turned on in the same unit time is set to be equal to or below the power upper limit value, thereby controlling the channels simultaneously turned on. However, in the peak power suppression control mode, since the time-divisional output control mode is a basic action, as with the time-divisional output control mode, the total target power value or total output power value does not conform to the power upper limit value with some exceptions.

Figure 8:
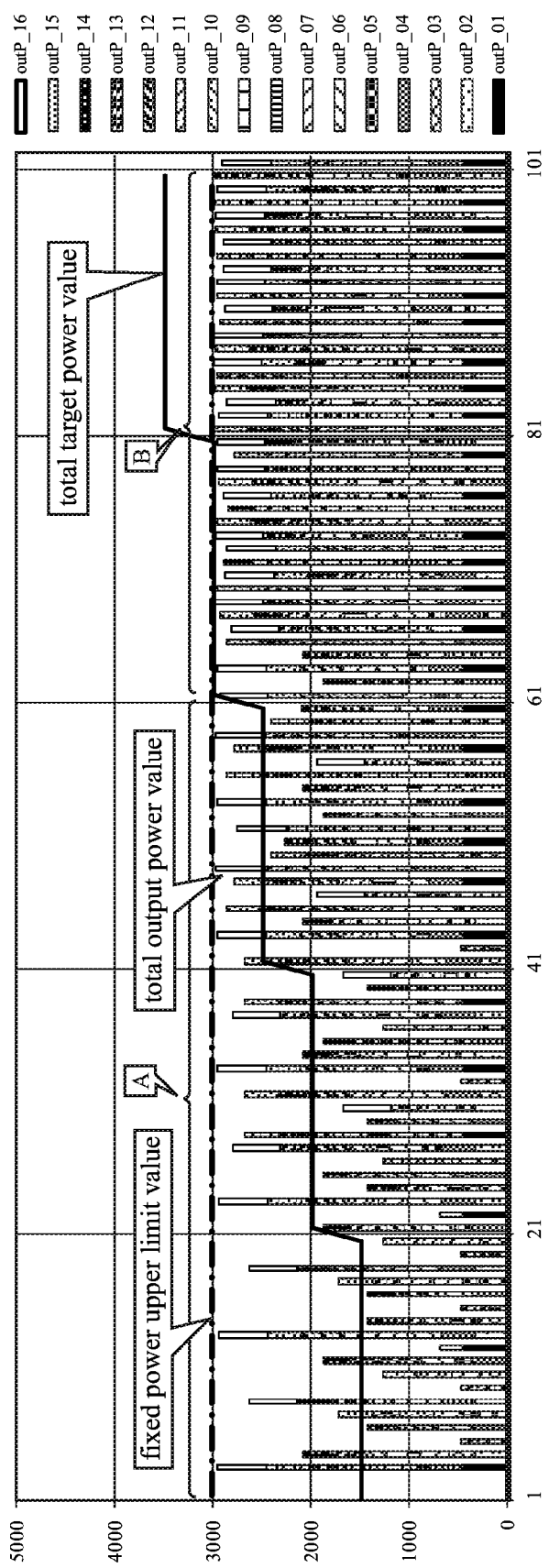
FIG. 8 is a schematic diagram showing one example of ON/OFF states of respective channels when a fixed power upper limit value is set.

FIG. 8 shows one example of ON/OFF states of respective channels when 16 channels as controlled objects are controlled in the peak power suppression control mode.

In the example of FIG. 8, the total output power value varies, and situations wherein all of channels are turned off or the power value is closer to the power upper limit value are found.

Further, the example of FIG. 8 shows that the greater the difference between the total target power value and the power upper limit value, the greater the difference between the maximum and minimum values of the total output power values in every unit time. At the same time, it shows that the smaller the difference between the total target power value and power upper limit value, the smaller the difference between the maximum and minimum values of the total output power values in every unit time.

From this, it is found that in order to lessen the difference between the maximum and minimum values of the total output power values in every unit time, the power upper limit value should be set as close to the total target power value as possible.

However, since the total output power values are discrete values, and the total output power value is less than the power upper limit value with some exceptions, if the power upper limit value excessively approaches the total target power value, the target power integrated value cannot be supplied to the load due to the peak power suppression control.

Figure 9:
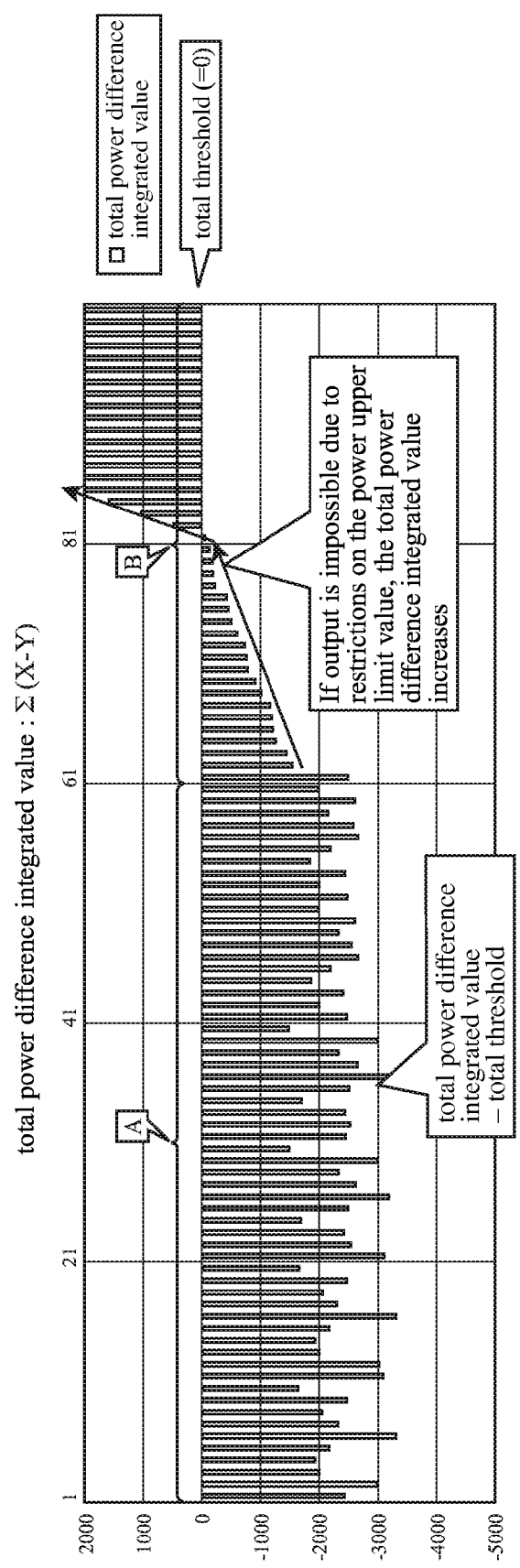
FIG. 9 is a schematic diagram showing one example of total power difference integrated values when a fixed power upper limit value is set.

Area B in FIG. 9 showing the change in the total power difference integrated value in Area B in FIG. 8 is one example showing the above described state. If the power upper limit value excessively approaches the total target power value, or if the power upper limit value is less than the total target power value, the total target power value cannot be output, and thus, the total power difference integrated value monotonically increases based on an operational principle of the time-divisional output control mode. Area B in FIG. 9 shows that when the power upper limit value excessively approaches the total target power value, or when the power upper limit value is less than the total target power value, the total power difference integrated value monotonically increases.

Based on the above, by setting the power upper limit value as a value derived by adding an appropriate power value to the total target power value, the difference between the maximum and minimum values of the total output power values in every unit time may be reduced, so as to achieve the supply of the target power value to the load.

The method for calculating the appropriate power upper limit value is clearly expressed below.

(1) A method in which a correction value is selected depending on a power control condition, such as consumed power or load factor for the loads 1-1 to 1-M, and added to the total target power value, thereby calculating the power upper limit value (hereinafter referred to as "Method A").

Figure 10:
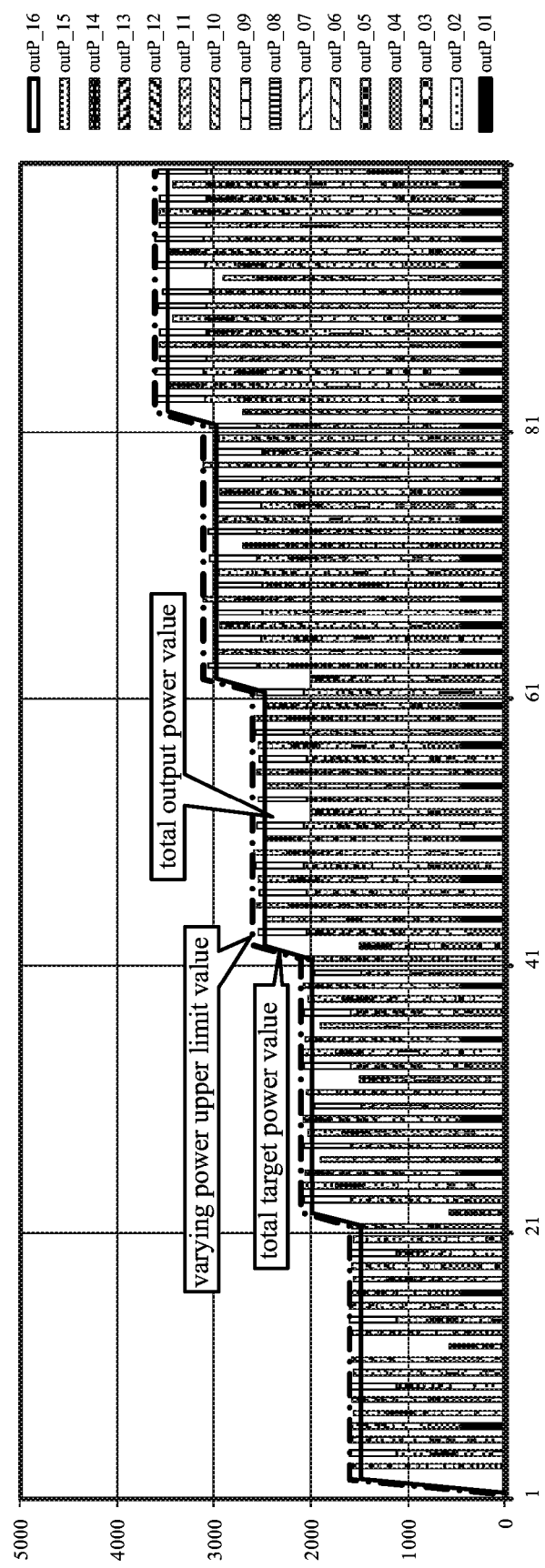
FIG. 10 is a schematic diagram showing one example of ON/OFF states of respective channels when a power upper limit value is set by Method A.

FIG. 10 is a schematic diagram showing one example of ON/OFF states of respective channels when the power upper limit value is established by Method A.

Figure 11:
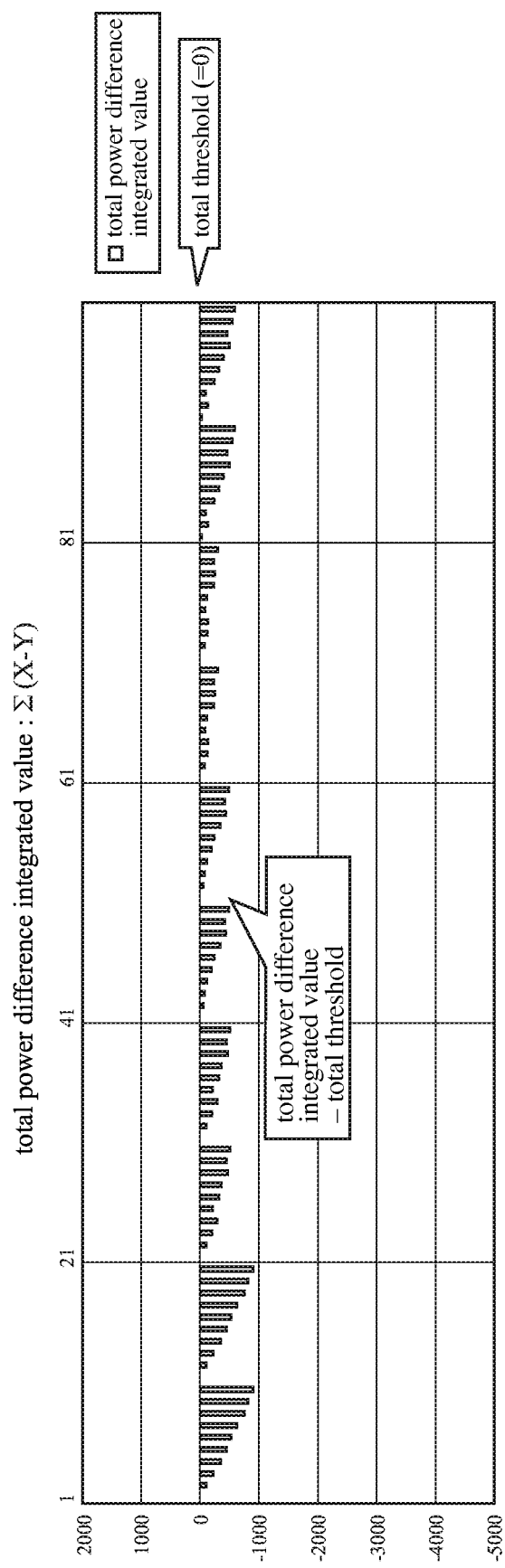
FIG. 11 is a schematic diagram showing one example of total power difference integrated values when the power upper limit value is set by Method A.

FIG. 11 is a schematic diagram showing one example of total power difference integrated values when the power upper limit value is established by Method A.

The appropriate power upper limit value varies depending on variation of rated power of each load 1-m or power target value sent from the regulator 2-m, etc., and thus, it should be any value within a predetermined range depending on the rated power or power target value.

If Method A is used, the correction value calculation section 19 selects, as the correction value $H_n$, any value within a range between 0 and the maximum value of the output power values (maximum value of power supplied to the load 1-m).

For example, in the $n^{th}$ control cycle, the output power value $q_{m(n-1)}$ tilde supplied to the load 1-m may be the correction value $H_n$, or, an average, minimum value, or maximum value of the output power values when power is supplied to the load 1-m may be the correction value $H_n$.

Further, the result derived by multiplying the average, minimum value, or maximum value by an appropriate coefficient may be the correction value $H_n$.

When the correction value calculation section 19 selects the correction value $H_n$, the upper limit value calculation section 20 adds the correction value $H_n$ to the total target power value (sum total $\Sigma x_n$ of target power values $x_{1n}$ to $x_{Mn}$ calculated by the total target power value calculation section 18) as described above, thereby calculating the power upper limit value $P_{LIM}$ for the supplied power value (refer to the above formula (6)).

This causes the power upper limit value $P_{LIM}$ to be within a range between the total target power value and a value derived from total target power value+correction value $H_n$.

In power control, since the supply of the target power value $x_{mn}$ to the load 1-m should have priority, the power upper limit value $P_{LIM}$ is desirably a sufficiently large value.

This provides a merit that while there is room for improvement in that the difference between the maximum and minimum values of the total output power values in every unit time may be further reduced, the power upper limit value $P_{LIM}$ established by Method A has a margin relative to the limit value (maximum value of the total output power values), and thus, delay of the output power value $q_{mn}$ tilde relative to the target power value $x_{mn}$ may be reduced to reduce an impact on temperature control.

As shown in FIG. 10, since the power upper limit value $P_{LIM}$ established by Method A varies depending on change in the total target power value, variation in the total output power value in every unit time becomes small, and as a result, the maximum value of the total output power values is also small.

For a fixed power upper limit value, as shown in Area B of FIG. 8, there is a problem that when the total target power value is equal to or greater than the power upper limit value, the total target power value cannot be output. However, if the power upper limit value $P_{LIM}$ is established by Method A, since it varies depending on change in the total target power value, the total target power value is not equal to or greater than the power upper limit value $P_{LIM}$ such that the above problem may be avoided.

Here, the power upper limit value $P_{LIM}$ is calculated by selecting the appropriate correction value $H_n$ and adding the correction value $H_n$ to the total target power value. However, by selecting a predetermined coefficient as the correction value $H_n$, and multiplying the coefficient by the total target power value, a power upper limit value $P_{LIM}'$ corresponding to the above power upper limit value $P_{LIM}$ ($P_{LIM} \approx P_{LIM}'$) may be calculated.

(2) A method in which the difference between the sum total of power difference integrated values of the loads 1-1 to 1-M and the sum total of thresholds for the loads 1-1 to 1-M is multiplied by a predetermined coefficient, and the multiplication result is added as the correction value to the total target power value, thereby calculating the power upper limit value (hereinafter referred to as "Method B").

Figure 12:
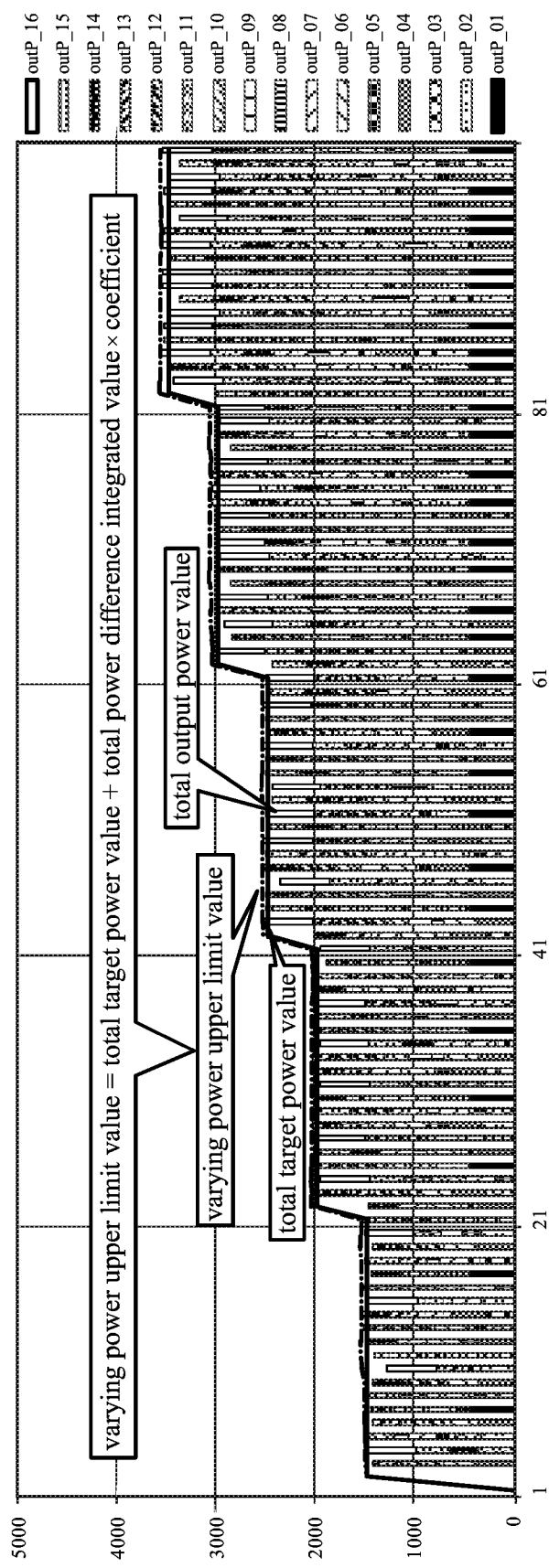
FIG. 12 is a schematic diagram showing one example of ON/OFF states of respective channels when the power upper limit value is set by Method B.

FIG. 12 is a schematic diagram showing one example of ON/OFF states of respective channels when the power upper limit value is established by Method B.

Figure 13:
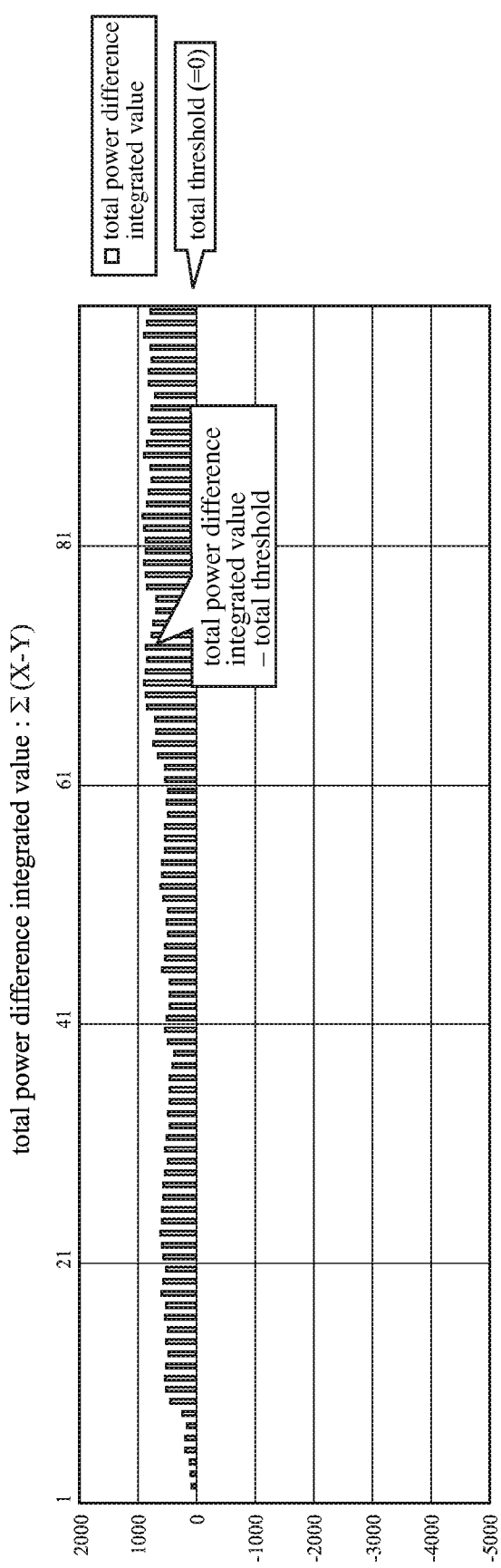
FIG. 13 is a schematic diagram showing one example of total power difference integrated values when the power upper limit value is set by Method B.

FIG. 13 is a schematic diagram showing one example of total power difference integrated values when the power upper limit value is established by Method B.

The sum total of thresholds $s_{th}$ for the loads 1-1 to 1-M is hereinafter referred to as "total threshold". In order to simplify the explanation here, the thresholds $s_{th}$ for the loads 1-1 to 1-M are zero.

In this case, Method B is a method in which "a predetermined coefficient is multiplied by the sum total of the power difference integrated values of the loads 1-1 to 1-M, and the multiplied result is added as the correction value $H_n$ to the total target power value, thereby calculating the power upper limit value $P_{LIM}$".

Incidentally, a reciprocal of the above predetermined coefficient corresponds to a value usually referred to as integral time in PID control. Thus, multiplication of the predetermined coefficient is synonymous with division by the integral time.

According to the time-divisional power control protocol, in the $n^{th}$ control cycle, the power difference integrated value $s_{m(n-1)}$ up to the $(n-1)^{th}$ control cycle calculated by the subtracter 22*a-m* in the intermediate integrated power value calculation section 22 is always smaller than the threshold $s_{th}$ (here, the threshold $s_{th}$ is zero, and thus, it is less than zero).

FIG. 9 is a schematic diagram showing one example of total power difference integrated values when a fixed power upper limit value is set, and Area A in FIG. 9 corresponds to the above state.

On the other hand, if no power is supplied to the load 1-m by a peak power suppression function, the power difference integrated value $s_{m(n-1)}$ up to the $(n-1)^{th}$ control cycle increases. Area B in FIG. 9 corresponds to the above states.

Thus, if the power upper limit value $P_{LIM}$ is calculated based on Method B by dividing the sum total $\Sigma s_{(n-1)}$ of power difference integrated values $s_{1(n-1)}$ to $s_{M(n-1)}$ of the loads 1-1 to 1-M by the integral time, and adding the division result as the correction value $H_n$ to the sum total $\Sigma x_n$ of target power values $x_{1n}$ to $x_{Mn}$, the following occurs.

Under the circumstances in which the power upper limit value $P_{LIM}$ is small, and the total output power value (sum total of output power values $q_{1(n-1)}$ tilde to $q_{m(n-1)}$ tilde of the loads 1-1 to 1-M calculated by the output power value calculation section 16) is small, the total power difference integrated value (sum total of power difference integrated values $s_{1(n-1)}$ to $s_{m(n-1)}$) is large, and thus, the power upper limit value $P_{LIM}$ becomes progressively larger, and thereby, over the course of time, provides a situation for outputting the target power value.

On the other hand, under the circumstances in which the power upper limit value $P_{LIM}$ is large, and sufficient total output power value may be output, the total power difference integrated value is a negative value (a value less than the total threshold), and thus, the power upper limit value $P_{LIM}$ becomes progressively smaller, and thereby, over the course of time, gets rid of the unnecessarily large power upper limit value $P_{LIM}$.

Based on the above, if the power upper limit value is established by Method B, an equilibrium state is provided with the power upper limit value $P_{LIM}$ being at an appropriate value, as shown in FIG. 12.

(3) A method for using Method A and Method B together (hereinafter referred to as "Method C").

Figure 14:
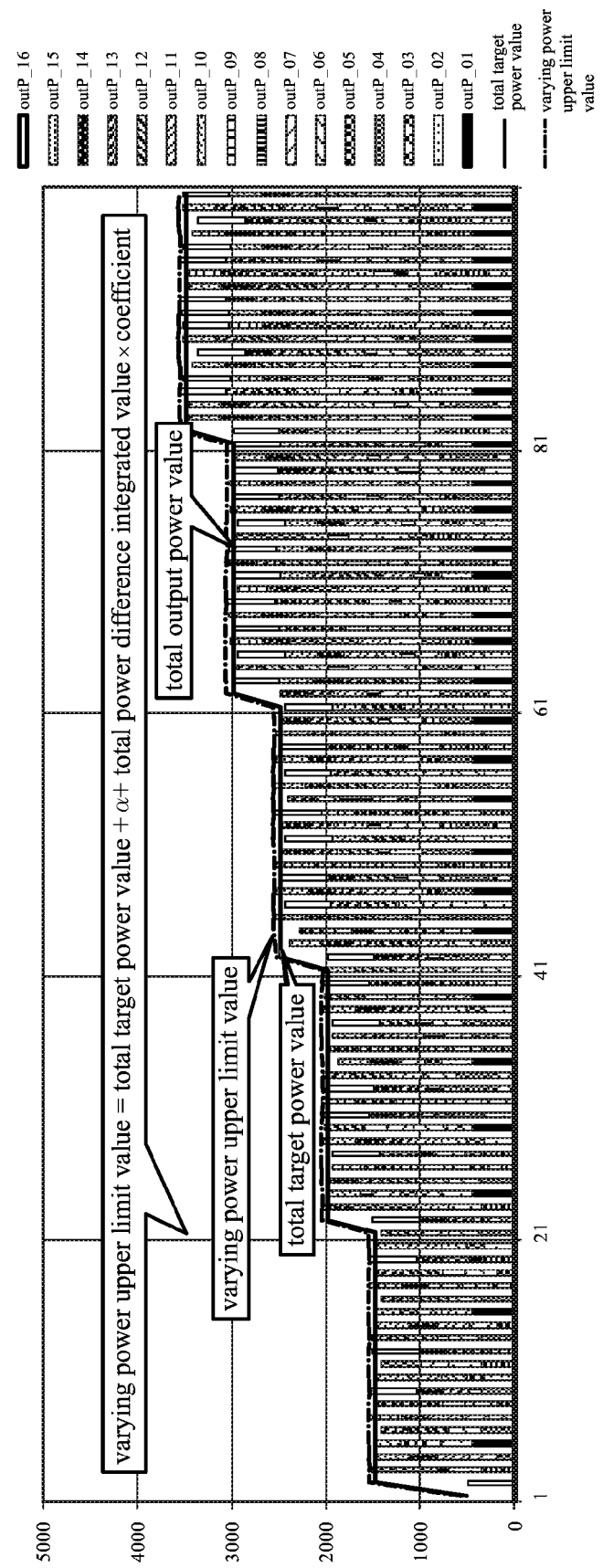
FIG. 14 is a schematic diagram showing one example of ON/OFF states of respective channels when the power upper limit value is set by Method C.

FIG. 14 is a schematic diagram showing one example of ON/OFF states of respective channels when the power upper limit value is established by Method C.

Figure 15:
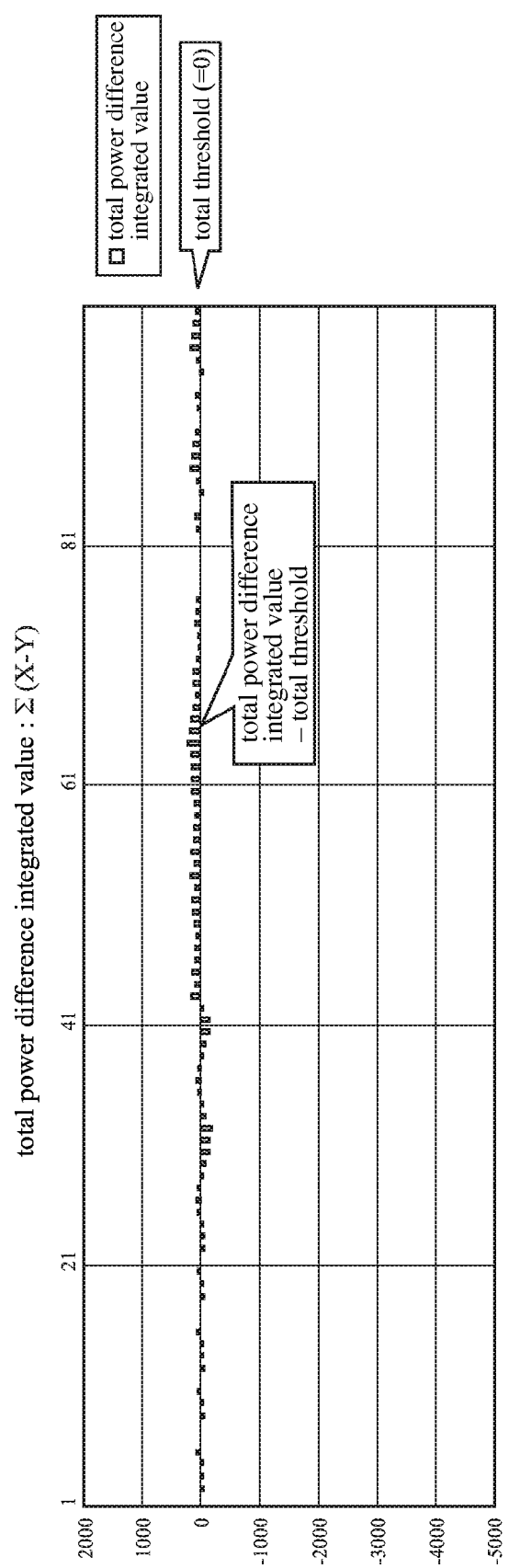
FIG. 15 is a schematic diagram showing one example of total power difference integrated values when the power upper limit value is set by Method C.

FIG. 15 is a schematic diagram showing one example of total power difference integrated values when the power upper limit value is established by Method C.

When Method C is used, the correction value calculation section 19 outputs either the correction value $H_n$ established by Method A (any value within the range between 0 and the maximum value of output power values), or the correction value $H_n$ established by Method B (division result by the integral time), to the upper limit value calculation section 20.

Upon receiving the correction value $H_n$ from the correction value calculation section 19, the upper limit value calculation section 20 adds the correction value $H_n$ to the total target power value (sum total $\Sigma x_n$ of target power values $x_{1n}$ to $x_{Mn}$ calculated by the total target power value calculation section 18), thereby calculating the power upper limit value $P_{LIM}$ of the supplied power value (refer to the above formula (6)).

When Method C is used, as shown in FIG. 14, the total power difference integrated value may be a value around zero (total threshold).

Thus, as shown in FIG. 15, this method may improve consistency between the total target power integrated value and the total output power integrated value, compared to the use of Method A or Method B alone.

As evidenced from the above, according to this Embodiment 1, the upper limit value calculation section 20 is provided which adds the correction value $H_n$ calculated by the correction value calculation section 19 to the sum total $\Sigma x_n$ of target power values $x_{1n}$ to $x_{Mn}$ calculated by the total target power value calculation section 18 so as to calculate the power upper limit value $P_{LIM}$ for all of the loads; and the ON-OFF device control section 23 is configured to turn on the power supply ON-OFF device 15-m for the load 1-m if the power supply condition is satisfied, and to turn off the power supply ON-OFF device 15-m for the load 1-m if the power supply condition is not satisfied, beginning with the load 1-m among the loads 1-1 to 1-M, having a larger intermediate integrated power value $S_{mn}$ hat calculated by the intermediate integrated power value calculation section 22, wherein the power supply condition is that the intermediate integrated power value $s_{mn}$ hat of the load 1-m is larger than the predetermined threshold $s_{th}$, and the sum total of power estimated value $q_{mon}$ tilde of the load 1-m estimated by the ON power estimation section 17 and the power estimated values $q_{mon}$ tilde of the loads determined to be turned on in the next control cycle among the estimated power values $q_{1on}$ tilde to $q_{Mon}$ tilde of the loads 1-1 to 1-M estimated by the ON power estimation section 17 does not exceed the power upper limit value $P_{LIM}$ calculated by the upper limit value calculation section 20. This provides an effect in which loss in controllability associated with the change in total target power value may be prevented and the power supply voltage fluctuation may be suppressed.

It also provides an effect of saving time to establish the power upper limit value $P_{LIM}$ by a user.

EXPLANATIONS OF NUMERALS

1-1 to 1-M: loads
2-1 to 2-M: regulators
11: target power value calculation section (target power value calculation means)
12: output target value input section
13: reference power value storage section
14-1 to 14-M: target power value calculation sections
15-1 to 15-M: power supply ON-OFF devices (switching control means)
16: output power value calculation section (output power value calculation means)
17: ON power estimation section (power estimation means)
18: total target power value calculation section (upper limit value calculation means)
19: correction value calculation section (upper limit value calculation means)
20: upper limit value calculation section (upper limit value calculation means)
21: peak power suppression operation section 22: intermediate integrated power value calculation section (intermediate integrated power value calculation means)
22a-1 to 22a-M: subtracters
22b-1 to 22b-M: adders
22c-1 to 22c-M: buffers ($Z^{-1}$)
23: ON-OFF device control section (controlling means)

The invention claimed is:

1. A power control device comprising:
a plurality of switching control means for switching on and off power supplied to each controlled object at time intervals of predetermined unit time;
a target power value calculation means for calculating a target power value that is a target value of the power supplied to each controlled object;
an output power value calculation means for calculating an output power value that is a value of the power supplied to each controlled object;
a power estimation means for estimating, for each controlled object, from the output power value calculated by the output power value calculation means while the power is supplied, a power value when the power is supplied to the controlled object within the unit time in the next control cycle;
an upper limit value calculation means for calculating an upper limit value of supplied power values for all of the controlled objects per unit time, based on a sum total of the target power values of the respective controlled objects calculated by the target power value calculation means;
an intermediate integrated power value calculation means for calculating a power difference integrated value by repeating an addition of the target power value calculated by the target power value calculation means and a subtraction of the output power value calculated by the output power value calculation means in every control cycle, and adding a power difference integrated value up to the previous control cycle and the target power value in the next control cycle calculated by the target power value calculation means, so as to calculate, for each controlled object, the added value that is the latest intermediate integrated power value; and
a power control means which repeats, with respect to the respective controlled objects in order beginning with a controlled object having a larger intermediate integrated power value calculated by the intermediate integrated power value calculation means, the control to turn on the switching control means for the controlled object if a power supply condition is satisfied, and to turn off the switching control means for the controlled object if the power supply condition is not satisfied, thereby controlling ON and OFF of the switching control means in the next control cycle for all of the controlled objects, wherein the power supply condition is that the intermediate integrated power value of the controlled object is greater than a predetermined threshold, and if the power is to be supplied to the controlled object, a sum total of the power value of the controlled object estimated by the power estimation means and the power values of other controlled objects estimated by the power estimation means and determined to be powered in the next control cycle does not exceed the upper limit value calculated by the upper limit value calculation means.

2. The power control device according to claim 1, characterized in that the upper limit value calculation means adds a predetermined correction value to the sum total of the target power values of the respective controlled objects calculated by the target power value calculation means, so as to calculate the upper limit value of the supplied power value.

3. The power control device according to claim 1, characterized in that the upper limit value calculation means multiplies a predetermined coefficient and the sum total of the target power values of the respective controlled objects calculated by the target power value calculation means, so as to calculate the upper limit value of the supplied power value.

4. The power control device according to claim 1, characterized in that the upper limit value calculation means divides a sum total of the power difference integrated values of the respective controlled objects calculated by the intermediate integrated power value calculation means by a predetermined integral time, and then, adds the division result as a correction value to the sum total of the target power values of the respective controlled objects calculated by the target power value calculation means, so as to calculate the upper limit value of the supplied power value.

5. The power control device according to claim 1, characterized in that the upper limit value calculation means divides a difference between the sum total of the power difference integrated values of the respective controlled objects calculated by the intermediate integrated power value calculation means and a sum total of thresholds for the respective controlled objects, by a predetermined integral time, and then, adds the division result as a correction value to the sum total of the target power values of the respective controlled objects calculated by the target power value calculation means, so as to calculate the upper limit value of the supplied power value.

6. The power control device according to claim 2, characterized in that the correction value added by the upper limit value calculation means is within a range from zero value to the maximum value of power supplied to the respective controlled objects.

7. The power control device according to claim 4, characterized in that the upper limit value calculation means adds either of the correction value within the range from zero value to the maximum value of power supplied to the respective controlled objects or the correction value that is the result from the division by the predetermined integral time, to the sum total of the target power values of the respective controlled objects calculated by the target power value calculation means, thereby calculating the upper limit value of the supplied power value.

8. The power control device according to claim 5, characterized in that the upper limit value calculation means adds either of the correction value within the range from zero value to the maximum value of power supplied to the respective controlled objects or the correction value that is the result from the division by the predetermined integral time, to the sum total of the target power values of the respective controlled objects calculated by the target power value calculation means, thereby calculating the upper limit value of the supplied power value.

9. A power control method comprising:
a plurality of switching steps in which a plurality of switching control means switch on and off power supplied to respective controlled objects at time intervals of predetermined unit time;
a target power value calculation step in which a target power value calculation means calculates a target power value that is a target value of the power supplied to each controlled object;

an output power value calculation step in which an output power value calculation means calculates an output power value that is a value of the power supplied to each controlled object;

a power estimation step in which a power estimation means estimates, for each controlled object, from the output power value calculated in the output power value calculation step while the power is supplied, a power value when the power is supplied to the controlled object within the unit time in the next control cycle;

an upper limit value calculation step in which an upper limit value calculation means calculates an upper limit value of supplied power values for all of the controlled objects per unit time, based on a sum total of the target power values of the respective controlled objects calculated in the target power value calculation step;

an intermediate integrated power value calculation step in which an intermediate integrated power value calculation means calculates a power difference integrated value by repeating an addition of the target power value calculated in the target power value calculation step and a subtraction of the output power value calculated in the output power value calculation step in every control cycle, and adds the power difference integrated value up to the previous control cycle and the target power value in the next control cycle calculated in the target power value calculation step, so as to calculate, for each controlled object, the added value that is the latest intermediate integrated power value; and a power control step in which a power control means repeats, with respect to the respective controlled objects in order beginning with a controlled object having a larger intermediate integrated power value calculated in the intermediate integrated power value calculation step, the control to turn on the switching control means for the controlled object if a power supply condition is satisfied, and to turn off the switching control means for the controlled object if the power supply condition is not satisfied, thereby controlling ON and OFF of the switching control means in the next control cycle for all of the controlled objects, wherein the power supply condition is that the intermediate integrated power value of the controlled object is greater than a predetermined threshold, and if the power is to be supplied to the controlled object, a sum total of the power value of the controlled object estimated in the power estimation step and the power values of other controlled objects estimated in the power estimation step and determined to be powered in the next control cycle does not exceed the upper limit value calculated in the upper limit value calculation step.

* * * * *